United States Patent
Abernathy et al.

(10) Patent No.: US 8,582,940 B2
(45) Date of Patent: Nov. 12, 2013

(54) FIBER OPTIC CABLES WITH EXTRUDED ACCESS FEATURES AND METHODS OF MAKING FIBER OPTIC CABLES

(71) Applicant: Corning Cable Systems LLC, Hickory, NC (US)

(72) Inventors: George Cornelius Abernathy, Hildebran, NC (US); David Wesley Chiasson, Edmonton (CA); Randall Dwaine Tuttle, Conover, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 13/845,697

(22) Filed: Mar. 18, 2013

(65) Prior Publication Data

US 2013/0230287 A1     Sep. 5, 2013

Related U.S. Application Data

(63) Continuation of application No. PCT/US2011/057574, filed on Oct. 25, 2011.

(60) Provisional application No. 61/407,744, filed on Oct. 28, 2010.

(51) Int. Cl.
*G02B 6/44*     (2006.01)

(52) U.S. Cl.
USPC .................................................. 385/100

(58) Field of Classification Search
USPC .................................................. 385/100
See application file for complete search history.

(56) References Cited

U.S. PATENT DOCUMENTS

| | | |
|---|---|---|
| 3,076,235 A | 2/1963 | Rollins et al. |
| 3,991,014 A | 11/1976 | Kleinschuster ............... 260/47 |
| 4,067,852 A | 1/1978 | Calundann ................... 260/47 |
| 4,083,829 A | 4/1978 | Calundann et al. ............ 260/47 |
| 4,130,545 A | 12/1978 | Calundann ................. 260/40 P |
| 4,237,337 A | 12/1980 | Serrander ................. 174/70 R |
| 4,248,824 A | 2/1981 | Hattop ........................ 264/171 |
| 4,318,842 A | 3/1982 | East et al. ................... 524/605 |
| 4,456,331 A | 6/1984 | Whitehead et al. ........ 350/96.23 |
| 4,468,364 A | 8/1984 | Ide ............................. 264/176 R |
| 4,707,074 A | 11/1987 | Heywood ................. 350/96.23 |
| 4,729,628 A | 3/1988 | Kraft et al. ............... 350/96.23 |
| 4,848,868 A | 7/1989 | Rohner ..................... 350/96.23 |
| 5,218,659 A | 6/1993 | Schneider .................. 385/110 |

(Continued)

FOREIGN PATENT DOCUMENTS

| | | | |
|---|---|---|---|
| DE | 4421456 A1 | 12/1995 | ............ B29C 47/02 |
| EP | 647866 A1 | 4/1995 | ............. G02B 6/44 |

(Continued)

OTHER PUBLICATIONS

U.S. Appl. No. 13/445,517, filed Apr. 12, 2012, Eric R. Logan, 29 pages.

(Continued)

*Primary Examiner* — Ryan Lepisto
*Assistant Examiner* — Jerry Blevins

(57) ABSTRACT

Cables are constructed with embedded discontinuities in the cable jacket that allow the jacket to be torn to provide access to the cable core. The discontinuities can be longitudinally extending strips of polymer material coextruded in the cable jacket.

19 Claims, 4 Drawing Sheets

(56) References Cited

U.S. PATENT DOCUMENTS

| | | | | |
|---|---|---|---|---|
| 5,360,497 | A | 11/1994 | Schneider et al. | 156/47 |
| 5,442,722 | A | 8/1995 | DeCarlo | 385/114 |
| 5,636,308 | A | 6/1997 | Personne et al. | 385/102 |
| 5,651,081 | A | 7/1997 | Blew et al. | 385/101 |
| 5,717,805 | A | 2/1998 | Stulpin | 385/114 |
| 5,737,470 | A | 4/1998 | Nagano et al. | 385/114 |
| 5,970,196 | A | 10/1999 | Greveling et al. | 385/114 |
| 5,987,204 | A | 11/1999 | Lee et al. | 385/100 |
| 6,041,153 | A | 3/2000 | Yang | 385/109 |
| 6,088,499 | A | 7/2000 | Newton et al. | 385/112 |
| 6,137,936 | A | 10/2000 | Fitz et al. | 385/113 |
| 6,167,180 | A | 12/2000 | Keller | 385/113 |
| 6,222,969 | B1 | 4/2001 | Botelho et al. | 385/114 |
| 6,311,000 | B1 | 10/2001 | Schneider | 385/113 |
| 6,351,589 | B1 | 2/2002 | Leggett | 385/128 |
| 6,404,962 | B1 | 6/2002 | Hardwick, III et al. | 385/114 |
| 6,519,396 | B2 | 2/2003 | Schneider et al. | 385/101 |
| 6,542,674 | B1 | 4/2003 | Gimblet | 385/113 |
| 6,545,222 | B2 | 4/2003 | Yokokawa et al. | 174/110 R |
| 6,546,176 | B2 | 4/2003 | Anderson et al. | 385/113 |
| 6,563,991 | B1 | 5/2003 | Witt et al. | 385/107 |
| 6,603,908 | B2 | 8/2003 | Dallas et al. | 385/100 |
| 6,661,956 | B2 | 12/2003 | Yamasaki et al. | 385/109 |
| 6,704,481 | B2 | 3/2004 | Gaillard et al. | 385/113 |
| 6,728,455 | B2 | 4/2004 | Kusakari et al. | 385/113 |
| 6,760,522 | B2 | 7/2004 | Okada et al. | 385/109 |
| 6,766,091 | B2 | 7/2004 | Beuth et al. | 385/128 |
| 6,813,421 | B2 | 11/2004 | Lail et al. | 385/101 |
| 6,876,798 | B2 | 4/2005 | Triplett et al. | 385/100 |
| 6,957,000 | B2 | 10/2005 | McAlpine et al. | 385/102 |
| 7,029,137 | B2 | 4/2006 | Lionetti et al. | 362/84 |
| 7,050,685 | B2 | 5/2006 | Plemmons et al. | 385/109 |
| 7,085,459 | B2 | 8/2006 | Conrad et al. | 385/114 |
| 7,116,872 | B2 | 10/2006 | Okuno et al. | 385/114 |
| 7,123,801 | B2 | 10/2006 | Fitz | 385/105 |
| 7,136,556 | B2 | 11/2006 | Brown et al. | 385/100 |
| 7,187,830 | B2 | 3/2007 | Blazer | 385/114 |
| 7,197,215 | B2 | 3/2007 | Baird et al. | 385/113 |
| 7,218,821 | B2 | 5/2007 | Bocanegra et al. | 385/103 |
| 7,225,534 | B2 | 6/2007 | Kachmar | 29/825 |
| 7,251,411 | B1 | 7/2007 | Lu et al. | 385/147 |
| 7,289,704 | B1 * | 10/2007 | Wagman et al. | 385/100 |
| 7,346,244 | B2 | 3/2008 | Gowan et al. | 385/113 |
| 7,379,642 | B2 | 5/2008 | Kachmar | 385/102 |
| 7,391,943 | B2 | 6/2008 | Blazer et al. | 385/100 |
| 7,400,810 | B2 | 7/2008 | Tanaka et al. | 385/134 |
| 7,403,685 | B2 | 7/2008 | Wells | 385/100 |
| 7,415,181 | B2 | 8/2008 | Greenwood et al. | 385/100 |
| 7,424,189 | B2 | 9/2008 | Lu et al. | 385/100 |
| 7,471,862 | B2 | 12/2008 | Bringuier et al. | 385/113 |
| 7,480,436 | B2 | 1/2009 | Wells et al. | 385/134 |
| 7,489,843 | B2 | 2/2009 | Carlson et al. | 385/100 |
| 7,532,796 | B2 | 5/2009 | Chiasson | 385/114 |
| 7,539,380 | B1 | 5/2009 | Abernathy et al. | 385/100 |
| 7,567,741 | B2 | 7/2009 | Abernathy et al. | 385/113 |
| 7,587,111 | B2 | 9/2009 | de Montmorillon et al. | 385/127 |
| 7,590,321 | B2 | 9/2009 | Lu et al. | 385/104 |
| 7,603,012 | B1 | 10/2009 | Ice | 385/103 |
| 7,623,747 | B2 | 11/2009 | De Montmorillon et al. | 385/124 |
| 7,693,375 | B2 | 4/2010 | Freeland et al. | 385/100 |
| 7,787,727 | B2 | 8/2010 | Bringuier et al. | 385/113 |
| 7,796,853 | B2 | 9/2010 | Abernathy et al. | 385/100 |
| 7,817,891 | B2 | 10/2010 | Lavenne et al. | 385/109 |
| 2003/0118295 | A1 | 6/2003 | Lail et al. | 385/101 |
| 2006/0045443 | A1 | 3/2006 | Blazer | 385/114 |
| 2006/0127016 | A1 | 6/2006 | Baird et al. | 385/113 |
| 2006/0133746 | A1 * | 6/2006 | Quinn et al. | 385/100 |
| 2006/0291787 | A1 | 12/2006 | Seddon | 385/113 |
| 2008/0013899 | A1 | 1/2008 | Gowan et al. | 385/113 |
| 2008/0193092 | A1 | 8/2008 | Greenwood et al. | 385/113 |
| 2009/0087148 | A1 | 4/2009 | Bradley et al. | 385/76 |
| 2009/0274425 | A1 | 11/2009 | Caldwell et al. | 385/102 |
| 2009/0274426 | A1 | 11/2009 | Lail | 385/105 |
| 2009/0317039 | A1 | 12/2009 | Blazer et al. | 385/107 |
| 2009/0324182 | A1 | 12/2009 | Kachmar et al. | 385/104 |
| 2010/0132973 | A1 | 6/2010 | Fitz et al. | 174/102 R |
| 2011/0217010 | A1 | 9/2011 | Kachmar | 385/111 |
| 2011/0229098 | A1 | 9/2011 | Abernathy et al. | 385/102 |
| 2013/0051743 | A1 * | 2/2013 | Gimblet et al. | 385/102 |

FOREIGN PATENT DOCUMENTS

| | | | | |
|---|---|---|---|---|
| EP | 749129 | A1 | 12/1996 | H01B 7/00 |
| EP | 1168024 | B1 | 6/2006 | G02B 6/44 |
| EP | 1376156 | B1 | 7/2006 | G02B 1/04 |
| JP | 60-91306 | A | 5/1985 | G02B 6/24 |
| JP | 63-120206 | U | 8/1988 | G02B 6/08 |
| JP | 9-230184 | A | 9/1997 | G02B 6/44 |
| JP | 2005-148373 | A | 6/2005 | G02B 6/44 |
| JP | 2005-345622 | A | 12/2005 | G02B 6/44 |
| JP | 2006-162703 | A | 6/2006 | G02B 6/44 |
| JP | 2006-171570 | A | 6/2006 | G02B 6/44 |
| JP | 2006-251769 | A | 9/2006 | G02B 6/44 |
| JP | 2006-251770 | A | 9/2006 | G02B 6/44 |
| JP | 2006-267600 | A | 10/2006 | G02B 6/44 |
| JP | 2007-272006 | A | 10/2007 | G02B 6/44 |
| JP | 2009-37150 | A | 2/2009 | G02B 6/44 |
| JP | 2009-258153 | A | 11/2009 | G02B 6/44 |
| KR | 2006-0081266 | | 7/2006 | G02B 6/44 |
| KR | 2006-0107414 | | 10/2006 | G02B 6/02 |
| WO | 03/046074 | A1 | 6/2003 | C08L 23/16 |
| WO | 2004/021367 | A2 | 3/2004 | H01B 7/00 |
| WO | 2005/096053 | A1 | 10/2005 | G02B 6/44 |
| WO | 2006/097540 | A1 | 9/2006 | G02B 6/44 |
| WO | 2011/109498 | A2 | 9/2011 | |
| WO | 2011/137236 | A1 | 11/2011 | B29C 47/02 |
| WO | 2012/058181 | A1 | 5/2012 | G02B 6/44 |
| WO | 2012/071490 | A2 | 5/2012 | B29C 47/02 |

OTHER PUBLICATIONS

U.S. Appl. No. 13/489,901, filed Jun. 6, 2012, Michael J. Gimblet, 23 pages.
U.S. Appl. No. 13/560,374, filed Jul. 27, 2012, Michael John Gimblet, 24 pages.
U.S. Appl. No. 13/646,962, filed Oct. 8, 2012, Anne Germaine Bringuier, 26 pages.
U.S. Appl. No. 13/658,404, filed Oct. 23, 2012, Michael John Gimblet, 21 pages.
U.S. Appl. No. 13/658,431, filed Oct. 23, 2012, Samuel Don Nave, 19 pages.
Nippon Telegraph and Telephone Corporation, Specification for Aerial SM Optical Fiber Cable, Spec. No. 520292, 4th Version, Jul. 29, 2002, 56 pages.
Renka Corporation, Single Mode Optical Fiber Cable, Specification No: RENKA/OFC/SM-DI/AR, Dec. 2000, 13 pages.
PCT IPRP for Publication WO2011137236, Nov. 6, 2011, 10 pages.
PCT ISR for Publication WO2011137236, Aug. 9, 2011, 6 pages.
PCT ISR for Publication WO2012058181, Feb. 23, 2012, 4 pages.
PCT ISR for Publication WO2012071490, Sep. 12, 2012, 7 pages.

* cited by examiner

FIBER OPTIC CABLES WITH EXTRUDED ACCESS FEATURES AND METHODS OF MAKING FIBER OPTIC CABLES

PRIORITY APPLICATION

This application is a continuation of International Application No. PCT/US11/57574 filed Oct. 25, 2011, which claims the benefit of priority to U.S. application No. 61/407,744, filed Oct. 28, 2010, both applications being incorporated herein by reference.

RELATED APPLICATIONS

This application is related to U.S. Prov. App. No. 61/330,038, filed Apr. 10, 2010, and to PCT App. No. PCT/US2009/058017, filed Sep. 23, 2009, the entire contents of both documents being hereby incorporated by reference, and to U.S. Pat. No. 7,391,943, issued Jun. 24, 2008.

BACKGROUND

In order to terminate the fibers within a cable, the fibers must be accessed within the protective structure that comprises the cable jacket. Access to the cable interior can be difficult if the cable is designed to maximize the protection of the fibers within. In most cases cable access is achieved through extensive use of sharp cutting tools which can be dangerous if handled improperly. In addition to the safety concern regarding cable access, additional time during fiber access and termination increases the cost of installing the cable.

SUMMARY

According to one embodiment, a cable comprises a core and a jacket surrounding the core. The jacket may be formed primarily from polymeric materials. The jacket comprises a primary portion of a first material, and at least one discontinuity of a second material. The discontinuity extends along a length of the cable, and allows the jacket to be separated to provide access to the core. The discontinuity can be embedded within a primary or main portion of the jacket. The discontinuity can extend along the entire length of the cable, or for shorter sections of the cable that allow access to particular sections of the cable.

According to one aspect, the second material of the discontinuity can be a polymeric material that is extruded in the same process as the first material of the jacket, which can be formed from a polymeric material different than that of the second material.

According to another aspect, the second material can be different from the first material due to its being subjected to different cure conditions.

According to another aspect, the degree of adhesion between the first material of the jacket and second material forming the discontinuity can be selected to provide desired separation properties as well as cable jacket properties. The cohesive strengths of the first material and of second material can also be selected to provide desirable separation and jacket properties.

According to another aspect, the second material can include selected quantities of the first material to enhance bonding between the main cable jacket portion and the discontinuities.

Those skilled in the art will appreciate the above stated advantages and other advantages and benefits of various additional embodiments reading the following detailed description with reference to the below-listed drawing figures.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the invention.

DETAILED DESCRIPTION

Figure 1:
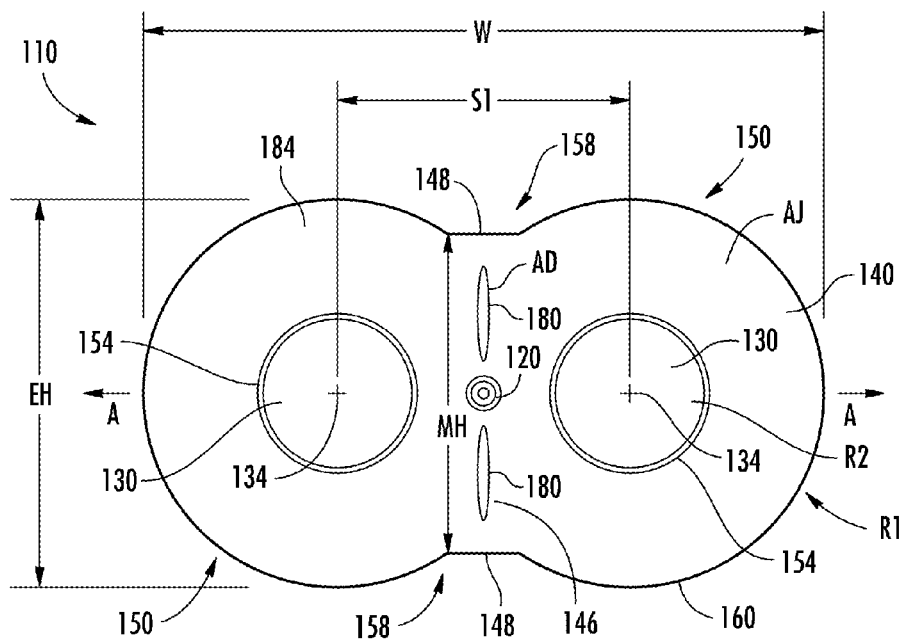
FIG. 1 is a cross-section of a fiber optic cable according to a first embodiment.

FIG. 1 is a cross-sectional view of a fiber optic cable 110 according to a first embodiment. The cable 110 has an optically conductive core 120, a first and a second strength component 130, and a cable jacket 140. The first and second strength components 130 are disposed on opposite sides of the optical fiber 120 and have axial centerlines 134. The core 120 can comprise, for example, one or more optical fibers. In the illustrated embodiment, the core 120 is a single optical fiber. The core 120 also has an axial centerline (not illustrated) located at the center of its cross-section that may be generally aligned with the axial centerlines 134 of the strength components 130 along a common plane A-A. The orientation of the strength components 130 on the common plane A-A in part provides preferential bend characteristics to the fiber optic cable 110. The axial centerlines of the core 120 or fibers in the cable 110 need not be exactly aligned with the plane passing through the axial centerlines of the strength components 130, and may move off of the plane, e.g. "up" and "down", with respect to the strength components 130 along the length of the cable 110. For the purposes of this specification, when the fiber or fibers of a cable are said to be "generally aligned with" or "aligned with" a plane passing through two strength components, it is understood that the fiber may be slightly offset from that plane, for example, by 0.5 millimeters in either direction. The jacket 140 can be formed primarily from polymer materials, and can be generally referred to as "polymeric." In this specification, the term "polymer" and "polymeric" include materials such as, for examples, copolymers, and polymer materials including additives such as fillers.

In the exemplary embodiment shown in FIG. 2, the cable jacket 140 envelops and may contact the optical fiber 120 and also envelops and may contact both strength components 130. The cable jacket 140 has a medial height MH which is measured as the jacket height or thickness in a medial or center region 146 of the cable cross-section, the medial region 146 being the portion of the jacket 140 located between the strength members 130. The medial height MH may also be defined as the height of the cable at the centerline of the optical fiber or group of optical fibers, or the height at a longitudinal bisection plane of the cable 110. The medial height MH may be measured between flat or relatively flat opposed medial surfaces 148 of the medial region 146, extending above and below the core 120. An end or total height EH of the cable jacket 140 is measured as the thickness of the jacket 140 at end portions 150 of the cable cross-section, extending above and below the centerline of each strength component 130. In the exemplary embodiments, the end height EH corresponds to the total height of the cable. In the exemplary embodiment, the end portions 150 extend outwardly from the medial region 146 in generally circular cross-sections. Quantities of adhesion promoter 154 may be included on the strength components 130 to promote bonding with the cable jacket 140. As illustrated, the adhesion promoters disclosed in this specification and in the figures appear to separate the cable jackets from the strength components. For the purposes of this specification, a strength component is considered to be "in contact" with a cable jacket if an adhesion promoter is interposed between the strength component and the cable jacket to promote bonding therebetween.

The cross-sectional footprint 160, or cross-sectional area, of the fiber optic cable 110 may be substantially smaller than the cross-sectional footprints of conventional fiber optic cables of the same type. The area of the cross-sectional footprint 160 may be less than about 25 millimeters squared, for example. According to one embodiment, the area of the cross-sectional footprint 160 is in the range of 8 millimeters squared to 22 millimeters squared. According to another embodiment, the area of the cross-sectional footprint 160 is in the range of 10 millimeters squared to 18 millimeters squared. The area AJ of the polymeric material forming the jacket 140 can be less than 13 millimeters squared. In the illustrated embodiment, the medial height MH is less than the end height EH at the strength components 130. Relief or recessed portions 158 in the cable jacket 140 are included to reduce stresses on the fiber in the core 120 in order to preserve optical performance, as discussed in further detail below. The height ratio for the cable 110 is defined as the ratio of the medial height MH to the end height EH, or MH/EH. According to one embodiment of the invention, the height ratio is less than 0.95, in the range of 0.5-0.95. The exemplary cable 110 has an overall width W in the range of about 3-6 millimeters. The radii R1 of the end portions 150 can be in the range of about 1-2 millimeters. The radii R2 of the strength components 130 can be in the range of about 0.35-0.9 millimeters. The separation distance S1 of the strength member axes 134 can be in the range of about 1.9-2.6 millimeters.

According to one aspect of the present embodiment, the jacket 140 includes a separation feature that facilitates access to the core 120. In the exemplary embodiment, the separation feature is a pair of discontinuities 180 that extend along the length of the cable 110, with one discontinuity located above the core 120 and one located below the core 120. The discontinuities 180 enable easier separation of the jacket 140 in the vicinity of the core 120, so that the jacket 140 can be pulled apart along the centerline of the cable 110. The core 120 and fiber(s) located therein are therefore easily accessed by bisecting the cable along fracture lines formed at the discontinuities 180. In this specification, the term "discontinuity" indicates a portion of the jacket 140 of different, second material composition than a primary portion 184 or first material of the jacket 140. The primary portion 184 of the jacket 140 can essentially be a unitary extruded polymer coating surrounding, embedding, and contacting the core 120, the strength components 130, and the discontinuities 180. The primary portion 184 also extends between the strength components 130 and the core 120. The discontinuities 180 extend longitudinally through the primary portion 184 along a selected length of the cable 110. Discontinuities extending along the entire length of the cable 110 are effective in providing access to the core 120. Shorter discontinuity lengths may also be effective however. For example, discontinuities having lengths of at least 10 centimeters along the length of the cable may be sufficient.

In the exemplary embodiment, the discontinuities 180 are bonded to the primary portion 184 of the jacket 140 when the jacket is extruded. The primary portion 184 and the discontinuities 180 can be formed from extrudable polymers, so that as the extrudates used to form the primary portion 184 and the discontinuities 180 cool and solidify, the extrudates become bonded to a desired degree. When the discontinuities 180 are formed while extruding the primary portion 184 of the jacket, the bond between discontinuity 180 and the remainder of the jacket 140 can be generally described as enabled by polymer chain entanglement as the jacket 140 solidifies. The degree of bonding between the primary jacket portion and the material within the discontinuity 180, the cohesion of the primary and second materials, and the shape of the discontinuity 180 can be selected to provide desirable separation properties at the discontinuities 180. The jacket 140 can accordingly comprise a cohesive, unitary, composite polymeric structure. The interfaces between the primary portion 184 and the discontinuities 180 can include transition regions between the materials of the primary portion 184 and the discontinuities 180. A discontinuity can be extruded into the primary portion 184 of the jacket 140 at any location where a point of access might be formed. In the illustrated embodiment, the discontinuities 180 are closely spaced from the core 120, and both discontinuities 180 are wholly embedded or surrounded by the primary portion 184 of the jacket 140. In alternative embodiments, discontinuities can extend to the outer perimeter of a cable jacket or to the outer perimeter of the core.

As shown in FIG. 1, the discontinuities 180 can be relatively narrow strips in the jacket 140, and may occupy relatively small portions of the jacket cross-sectional area AJ. For example, the discontinuities 180 can have cross-sectional areas $A_D$ that are less than 10% of AJ, and as low as less than 5% of AJ. In the illustrated embodiment, the discontinuities 180 each have cross-sectional areas $A_D$ that are less than 2% of AJ. In FIG. 1, two discontinuities 180 are formed in the jacket 140 to facilitate opening of the jacket 140. Depending on the form that the core 120 takes, the number, spacing, shape, composition and other aspects of the discontinuities 180 can be varied. For example, a single discontinuity in the jacket 140 may be sufficient to allow the cable jacket 140 to be opened away from the core 120.

Figure 2C:
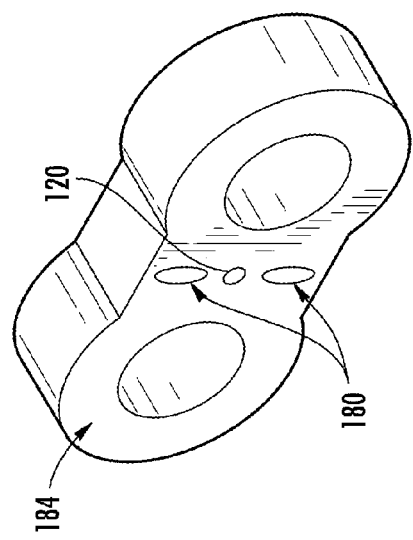
FIG. 2C is a perspective view of a section of the cable jacket illustrated in FIG. 2A.
Figure 2A:
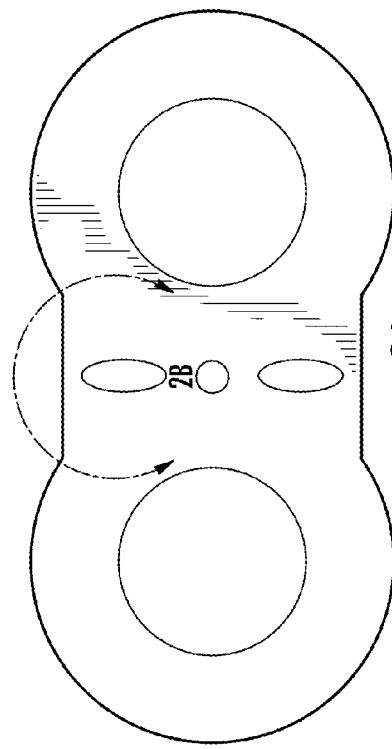
FIG. 2A is a cross-section of the cable jacket illustrated in FIG. 1.
Figure 2B:
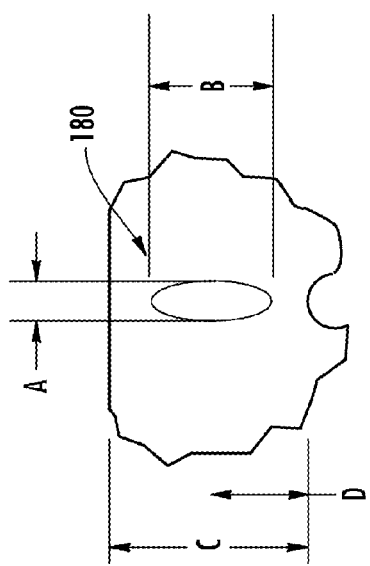
FIG. 2B is an isolated view of a portion of the cable jacket taken on section line 2B in FIG. 2A.

FIGS. 2A-2C illustrate the discontinuities 180 in greater detail. FIG. 2B is an isolated view of one of the discontinuities 180 in the jacket 140. Referring to FIG. 2B, a discontinuity 180 can have a maximum width A, a height B, and a center spacing from the core 120 of D. The distance from the top surface of the cable to the core 120 is C. According to one aspect, the aspect ratio A:B is in the range of 1:4 to 1:100. In general, lower aspect ratios A:B, which indicates narrower discontinuities, are favorable in cable cross-sections as shown in FIGS. 2A-2C. It is these discontinuities that allow for a stress concentration to develop at the root of a discontinuity and thus initiate failure of the primary jacket material. The illustrated ratio B:C is about 1:2, which indicates that the height of a discontinuity is about half of the jacket thickness between the core and the top, central portion of the jacket. The ratio B:C is selected to provide ease of access to the core and to maintain sufficient robustness of the cable 110, and will vary with factors such as the fracture toughness of the material of the primary portion 184, the bond between the discontinuities 180 and the primary portion 184, and other factors. According to one embodiment, the ratio B:C is at least 1:4, or, stated alternatively, B is at least ¼ of the jacket thickness C at the centerline of the cable.

Figure 3:
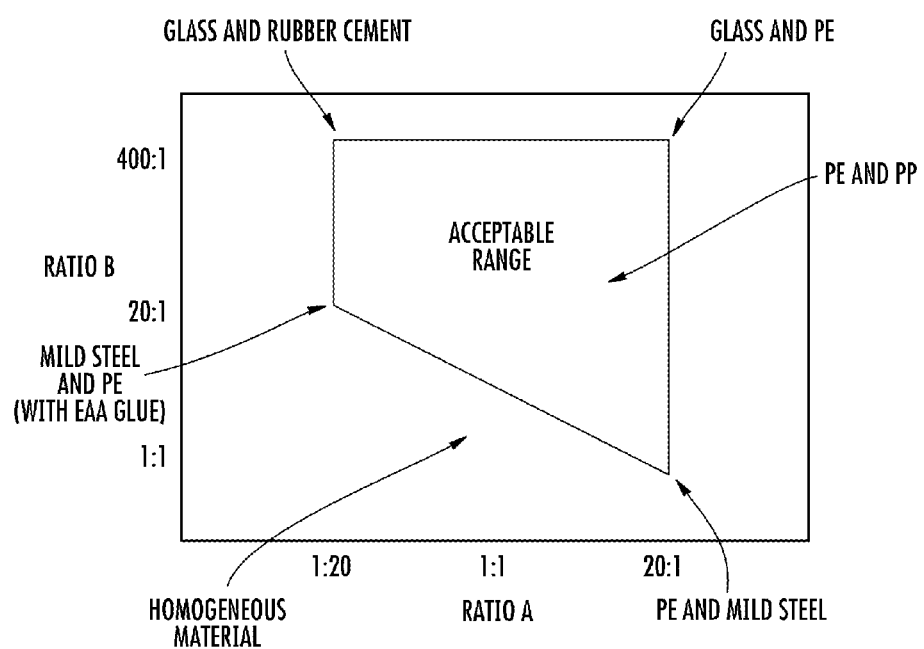
FIG. 3 illustrates various adhesion ratios.

The ratio of the adhesion strength between the first material of the primary portion 184 and the second material of the discontinuities 180 is also a factor in determining the shape and composition discontinuities. The ratio of the second material cohesive strength to the adhesion strength between the first and second materials (Ratio A) can be in the range of, for example, 1:20 to 20:1. FIG. 3 illustrates various adhesion ratios. With a secondary cohesive discontinuity 180 strength to adhesion strength of 1:20, there is very little cohesive strength within the second material compared to the adhesion between the two materials and thus failure will take place within the second material. A ratio of 20:1 indicates a relatively strong cohesive second material compared to the adhesive bond between the materials and thus failure will take place at the interface between the primary portion 184 and the discontinuity 180. In the illustrated embodiment, the adhesion ratio is at least 4:1. It is the failure of the material or bond that allows for a sufficient stress concentration to develop at the tip of the discontinuity 180 and thus initiate failure of the first material. The ratio of the first material strength to the adhesion between the first and the second material (ratio B) can be, for example, in the range of 20:1 and 400:1. Ratio B in the range of 1:1 and 20:1 will follow a linear relationship with ratio A in the range of ratio A stated above.

The materials and processes used to form the primary portion 184 and the discontinuities 180 can be selected for relatively easy access to the core 120 by tearing the jacket 140. The cable 110 may be constructed to meet other requirements for robustness, such as requirements for the jacket 140 stay intact under tensile loads, twisting, in temperature variations, and when subjected to other known cable test criteria, such as, for example, ICEA 460, and GR20. In the illustrated embodiment, the primary portion 184 in the illustrated jacket 140 is extruded from medium density polyethylene (MDPE), and the discontinuities 180 are extruded from a second material primarily of polypropylene (PP). The jacket 140 is formed in a coextrusion process so that the primary portion 184 and the discontinuities 180 bond during cooling to form relatively strong bonds. The cable jacket 140 can be robust yet relatively low pull forces are sufficient to shear or tear the jacket 140 along the discontinuities 180. Without being bound by theory, Applicants believe the bond between polypropylene of the discontinuity and polyethylene of the main portion can be created by adding selected quantities of ethylene compounded in the polypropylene discontinuity. The quantities of polyethylene in the discontinuity 180 are believed to bond with the polyethylene of the primary portion 184, as well as resulting in molecular entanglement between the polyethylene and polypropylene. According to this understanding, the amount of ethylene in the polypropylene extrudate used to form the discontinuities 180 can be increased to increase the bond between the discontinuities and the remainder of the jacket 140.

In general, if the primary portion 184 is formed from a first extruded polymer material, and the discontinuities 180 are formed from a second extruded polymer material, the discontinuities can include from 0.5%-20% by weight of the first polymer material. One embodiment of a thin film discontinuity contains PP with about 9% PE. Higher PE contents, such as to up 20% PE, are also possible. PE contents of less than 0.2% in PP may result in insufficient bonding between the main portion and a discontinuity. In one embodiment, the first polymer material is comprised of at least eighty percent by weight of a first polymer, and the second extruded polymeric material is comprised of at least seventy percent by weight of a second polymer and at least 0.5 percent by weight of the first polymer. In this embodiment, the first polymer can be PE and the second polymer can be PP.

Coextrusion of the discontinuities 180 and the main portion 184 can be achieved by adapting a conventional extrusion head such as is used to from the cables disclosed in PCT App. No. PCT/US2009/058017. The extrusion head is adapted by adding one or more apertures through the extrusion head that allow the introduction of a second, molten extrudate material into the molten first extrudate used to form the first portion 184 of the jacket 140. The first and second extrudate materials are allowed to cool and solidify together and to achieve a desired degree of bonding between the first portion and the discontinuities. According to the present embodiment, the first and second extrudate materials can be introduced into and extruded through a common extrusion head so that discontinuities and the first jacket portion are coextruded at the same location.

Figure 4C:
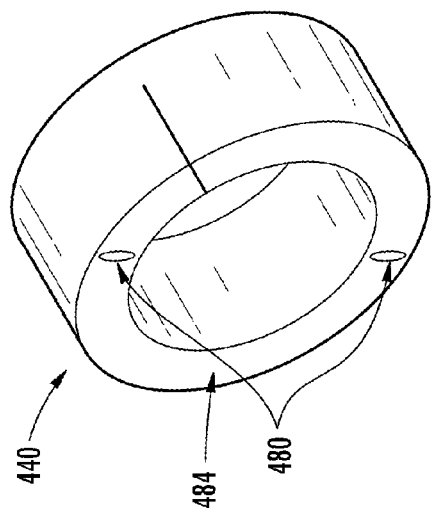
FIG. 4C is a perspective view of a section of the cable jacket illustrated in FIG. 4A.
Figure 4A:
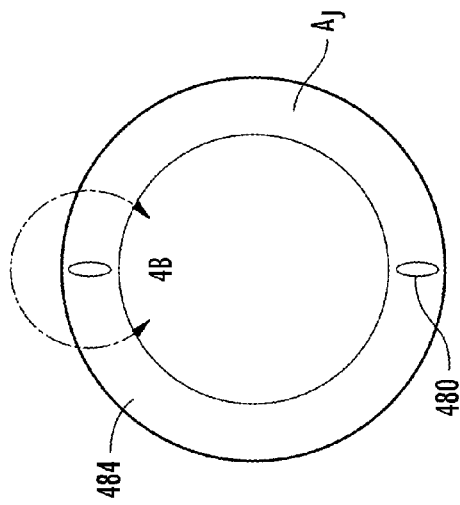
FIG. 4A is a cross-section of a cable jacket according to a second embodiment.
Figure 4B:
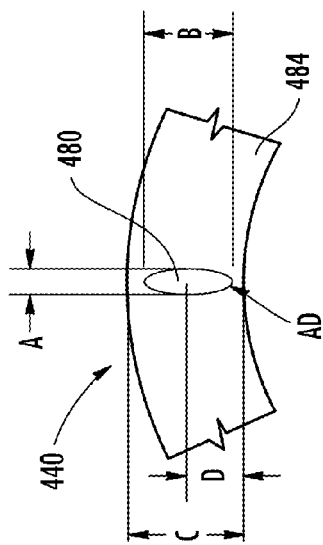
FIG. 4B is an isolated view of a portion of the cable jacket taken on section line 4B in FIG. 4A.

FIGS. 4A-4C illustrate an alternative, annular jacket 440 according to a second embodiment. The jacket 440 is suitable for use in round cross-section cables similar to those disclosed in U.S. Prov. App. No. 61/330,038. The jacket 440 includes two discontinuities 480 that can be used as breach locations where the jacket 440 can be separated from a cable core as shown in U.S. Prov. App. No. 61/330,038, from an armor, or from another component of a cable. The primary portion 484 of the jacket 440 can essentially be a unitary extruded polymer coating in which the discontinuities 480 are wholly embedded.

In the exemplary embodiment, the discontinuities 480 are bonded to the primary portion 484 of the jacket 440 when the jacket is extruded. The primary portion 484 and the discontinuities 480 can be formed from extrudable polymers, so that as the two extrudate materials used to form the primary portion 484 and the discontinuities 480 cool and solidify, the extrudates become bonded to a desired degree. When the discontinuities 480 are formed while extruding the primary portion 484 of the jacket, the bond between the discontinuity 480 and the remainder of the jacket 440 can be generally described as enabled by polymer chain entanglement as the jacket 440 solidifies. The degree of bonding can be selected to provide desirable separation properties at the discontinuities 480. The jacket 440 can accordingly comprise a cohesive, unitary, composite polymeric structure. A discontinuity can be extruded into the primary portion 484 of the jacket 440 at any location where a point of access might be formed. In the illustrated embodiment, the discontinuities 480 are located on opposite sides of the annular jacket 440 to that the jacket can be torn in half and pulled away. Both discontinuities 480 are wholly embedded or surrounded by the primary portion 484 of the jacket 440.

As shown in FIG. 4A, the discontinuities 480 can be relatively narrow strips in the jacket 440, and may occupy relatively small portions of the jacket cross-sectional area AJ. For example, the discontinuities 480 can have cross-sectional areas AD that are less than 10% of AJ, and as low as less than 5% of AJ. In the illustrated embodiment, the discontinuities 480 each have cross-sectional areas AD that are less than 2% of AJ.

Referring to FIG. 4B, a discontinuity 480 can have a maximum width A, a height B, and a center spacing from an inner edge of the jacket 440 of D. The thickness of the jacket 440 is C. According to one aspect, the aspect ratio A:B is in the range of 1:4 to 1:100. In general, lower aspect ratios A:B, which indicates narrower discontinuities, are favorable. The illustrated ratio B:C is about 2:3, which indicates that the height of a discontinuity is about ⅔ of the jacket thickness. The ratio B:C is selected to provide ease of access to the core and to maintain sufficient robustness of the cable 410, and will vary with factors such as the fracture toughness of the material of the primary portion 484, the bond between the discontinuities 480, and other factors. According to one embodiment, the ratio B:C is at least 1:3, or, stated alternatively, B is at least ⅓ of the jacket thickness C.

In the illustrated embodiment, the primary portion 484 in the illustrated jacket 440 is extruded from medium density polyethylene (MDPE), and the discontinuities 480 are extruded from a material primarily comprised of polypropylene (PP) with small amounts of MDPE compounded therein. The jacket 440 was formed in a coextrusion process so that the primary portion 484 and the discontinuities 480 bonded during cooling to form relatively strong bonds. The cable jacket 440 is robust yet relatively low pull forces are sufficient to shear the jacket 440 along the discontinuities 480.

Coextrusion of the discontinuities 480 and the main portion 484 can be achieved by adapting a conventional extrusion head. The extrusion head is adapted by adding one or more apertures through the extrusion head that allow the introduction of a second, molten extrudate material into the molten first extrudate used to form the primary portion 484 of the jacket 440. The first and second extrudate materials are allowed to cool and solidify together and to achieve a desired degree of bonding between primary portion and discontinuity. According to the present embodiment, the first and second extrudate materials can be introduced into and extruded through a common extrusion head.

The cable jacket primary portions and the discontinuities described in this specification can be made from various polymer materials. Either primary portion or discontinuity may be made from polypropylene (PP), polyethylene (PE), or blends of materials such as a blend of PE and ethylene vinyl acetate (EVA), flame-retardant material such as flame-retardant polyethylene, flame-retardant polypropylene, polyvinyl chloride (PVC), or polyvinylidene fluoride PVDF, filled materials such as polybutylene terephthalate (PBT), a polycarbonate and/or a polyethylene (PE) material and/or an ethylene vinyl acrylate (EVA) or other blends thereof having fillers like a chalk, talc, or the like, and other materials such as a UV-curable acrylates.

The terms "polymer" and "polymeric" as used in this specification indicate extrudable materials consisting primarily of polymers, but allows for the inclusion of filler materials, for example.

In general, the desirable separation properties disclosed in this specification may be obtained by coextruding the discontinuities from a different material than the material used to form the primary portion of the jacket. As an alternative method, the discontinuities may be made from the same material as the remainder of the jacket, but subjected to different curing conditions, for example.

Many modifications and other embodiments, within the scope of the claims will be apparent to those skilled in the art. For instance, the concepts of the present invention can be used with any suitable fiber optic cable design and/or method of manufacture. Thus, it is intended that this invention covers these modifications and embodiments as well those also apparent to those skilled in the art.

What is claimed is:

1. A cable, comprising:
   a core comprising at least one optical fiber; and
   a jacket surrounding the core, the jacket comprising:
   a primary portion of a first material; and
   at least one discontinuity of a second material wholly embedded in the primary portion, the discontinuity extending along a length of the cable, wherein the first and second materials are extrudable, the first material being different from the second material, wherein a height of the discontinuity is at least four times greater than a maximum width of the discontinuity, wherein the discontinuity and the primary portion allow the jacket to be separated at the discontinuity to provide access to the core.

2. The cable of claim 1, wherein the ratio of the height of the discontinuity and the width of the discontinuity is in the range of 1:4 to 1:100, thereby allowing for a stress concentration to develop at the root of the discontinuity.

3. The cable of claim 2, wherein the first material is polymeric and wherein the second material is polymeric.

4. The cable of claim 3, wherein the first material is comprised of at least eighty percent by weight of a first polymer, and wherein the second material is comprised of at least seventy percent by weight of a second polymer and at least 0.5 percent by weight of the first polymer.

5. The cable of claim 4, wherein the first polymer is polyethylene and the second polymer is polypropylene.

6. The cable of claim 5, wherein the second material includes from 0.5% to 20% by weight of the first polymer.

7. The cable of claim 3, wherein the discontinuity extends along the entire length of the cable, wherein the at least one discontinuity includes two discontinuities that are spaced from one another in the jacket, and wherein a cross-sectional area of each discontinuity is less than 5% of a cross-sectional area of the jacket.

8. The cable of claim 1, further comprising:
   a first strength member on a first side of the core;
   a second strength member on a second side of the core; and
   wherein the jacket surrounds the core and the strength members.

9. The cable of claim 8, wherein a height of the discontinuity is at least one third of a distance between the core and a closest exterior edge of the jacket.

10. The cable of claim 8, wherein the cable jacket has a medial height disposed about the at least one optical fiber, and an end height disposed about the first strength component, the medial height being less than the end height, wherein a ratio of the medial height to the end height is less than 0.95.

11. The cable of claim 10, wherein a cross-sectional area of the cable is in the range of 8-22 millimeters squared, wherein the fiber optic cable has a width in the range of 3-6 millimeters.

12. The cable of claim 1, wherein the jacket comprises a cohesive, unitary, composite polymeric structure, wherein the jacket has an annular structure, and wherein the discontinuities are located on opposite sides of the annular jacket, whereby the jacket may be torn in half and pulled away.

13. A cable, comprising:
   a core comprising at least one optical fiber; and
   a jacket surrounding the core, wherein the jacket comprises
   a cohesive, unitary, composite polymeric structure, wherein the jacket has an annular structure, the jacket comprising:
   a primary portion of a first material; and
   at least two discontinuities of a second material wholly embedded in the primary portion, each discontinuity extending along a length of the cable,
   wherein the first and second materials are extrudable, the first material being different from the second material, wherein a height of each of the at least two discontinuities is at least one third of a distance between the core and a closest exterior edge of the jacket, and wherein the height of each of the at least two discontinuities is at least four times greater than a maximum width of the discontinuity.

14. The cable of claim 13, wherein the at least two discontinuities are located on opposite sides of the annular jacket, whereby the jacket may be torn in half and pulled away.

15. The cable of claim 14, wherein the ratio of the height of the discontinuity and the width of the discontinuity is in the range of 1:4 to 1:100, thereby allowing for a stress concentration to develop at the root of the discontinuity.

16. The cable of claim 13, wherein the first material is polymeric and wherein the second material is polymeric, wherein the first material is comprised of at least eighty percent by weight of a first polymer, and wherein the second material is comprised of at least seventy percent by weight of a second polymer and at least 0.5 percent by weight of the first polymer.

17. The cable of claim 16, wherein the first polymer is polyethylene and the second polymer is polypropylene.

18. The cable of claim 16, wherein the second material includes from 0.5% to 20% by weight of the first polymer.

19. The cable of claim 13, wherein the discontinuity extends along the entire length of the cable, and wherein a cross-sectional area of each discontinuity is less than 5% of a cross-sectional area of the jacket.

\* \* \* \* \*